United States Patent
Nantel et al.

(10) Patent No.: US 7,552,655 B2
(45) Date of Patent: *Jun. 30, 2009

(54) SYSTEMS AND METHODS FOR NON-DESTRUCTIVE MASS SENSING

(75) Inventors: Normand Nantel, San Carlos, CA (US); Adrian Smith, Emerald Hills, CA (US); Scot Cheu, San Jose, CA (US); Derrick J. Parks, Belmont, CA (US); Jamshed Ghandhi, San Carlos, CA (US)

(73) Assignee: Novartis Pharma AG, Basel (CH)

( * ) Notice: Subject to any disclaimer, the term of this patent is extended or adjusted under 35 U.S.C. 154(b) by 54 days.

This patent is subject to a terminal disclaimer.

(21) Appl. No.: 11/999,316

(22) Filed: Dec. 4, 2007

(65) Prior Publication Data
US 2008/0087111 A1    Apr. 17, 2008

Related U.S. Application Data

(63) Continuation of application No. 09/731,317, filed on Dec. 6, 2000, now Pat. No. 7,304,750.

(60) Provisional application No. 60/172,316, filed on Dec. 17, 1999.

(51) Int. Cl.
*G01G 9/00* (2006.01)

(52) U.S. Cl. ......................................................... 73/865

(58) Field of Classification Search .................. 73/865; 356/432–436; 361/280
See application file for complete search history.

(56) References Cited

U.S. PATENT DOCUMENTS

| | | | |
|---|---|---|---|
| 2,049,870 A | 8/1936 | Schiff | |
| 2,531,245 A | 11/1950 | Bailey | |
| 2,540,059 A | 1/1951 | Stirn et al. | |
| 3,361,911 A * | 1/1968 | Kowalczynski | 378/89 |
| 3,578,041 A | 5/1971 | Obara | |
| 3,578,778 A | 5/1971 | Mathews | |
| 3,629,586 A | 12/1971 | Giles | |
| 3,744,582 A | 7/1973 | Withnell et al. | |
| 3,804,245 A | 4/1974 | Pendleton | |
| 3,871,626 A | 3/1975 | Wohlfarth | |
| 3,874,431 A | 4/1975 | Aronson | |
| 3,899,417 A | 8/1975 | Morris | |
| 4,067,225 A | 1/1978 | Dorman | |
| 4,106,535 A | 8/1978 | Davis | |

(Continued)

FOREIGN PATENT DOCUMENTS

CA             949786          6/1974

(Continued)

OTHER PUBLICATIONS

International Search Report, mailed Mar. 22, 2001, in PCT/US00/34109, filed Dec. 15, 2000.

*Primary Examiner*—Hezron Williams
*Assistant Examiner*—Gunnar J Gissel
(74) *Attorney, Agent, or Firm*—Michael J. Mazza

(57) ABSTRACT

The invention provides systems and methods for measuring the mass of a substance. In one method, energy is applied to a substance and a response resulting from the application of energy as measured. The mass of the substance is then determined based at least in part on the measured response.

20 Claims, 9 Drawing Sheets

U.S. PATENT DOCUMENTS

| | | | |
|---|---|---|---|
| 4,147,618 A | 4/1979 | Richardson et al. | |
| 4,223,751 A * | 9/1980 | Ayers et al. | 177/210 C |
| 4,320,657 A | 3/1982 | Johnson, III | |
| 4,461,363 A * | 7/1984 | Loy | 177/1 |
| 4,481,987 A | 11/1984 | Burns | |
| 4,509,568 A | 4/1985 | Kawaguchi et al. | |
| 4,519,506 A | 5/1985 | Cornelis | |
| 4,616,152 A | 10/1986 | Saito et al. | |
| 4,640,322 A | 2/1987 | Ballester | |
| 4,640,376 A | 2/1987 | Hinzpeter | |
| 4,684,041 A | 8/1987 | Jones et al. | |
| 4,688,610 A | 8/1987 | Campbell | |
| 4,719,409 A | 1/1988 | Dorman | |
| 4,811,802 A * | 3/1989 | Yamamoto et al. | 177/1 |
| 4,825,454 A | 4/1989 | Annis et al. | |
| 4,864,876 A | 9/1989 | Botzolakis et al. | |
| 4,953,643 A | 9/1990 | Ellion et al. | |
| 4,974,646 A | 12/1990 | Martin et al. | |
| 4,984,128 A | 1/1991 | Cebon | |
| 5,053,185 A | 10/1991 | Christensen et al. | |
| 5,143,126 A | 9/1992 | Boesch et al. | |
| 5,219,008 A | 6/1993 | Shannon | |
| 5,287,897 A | 2/1994 | Gamberini | |
| 5,366,122 A | 11/1994 | Guentert | |
| 5,377,727 A | 1/1995 | Ueda et al. | |
| 5,456,298 A | 10/1995 | Tennis | |
| 5,544,683 A | 8/1996 | Guhl | |
| 5,575,280 A | 11/1996 | Gupte et al. | |
| 5,602,485 A * | 2/1997 | Mayer et al. | 324/663 |
| 5,617,971 A | 4/1997 | Eason et al. | |
| 5,750,938 A * | 5/1998 | De Caris et al. | 177/50 |
| 5,765,607 A | 6/1998 | Ansaloni | |
| 5,826,633 A | 10/1998 | Parks et al. | |
| 5,865,012 A | 2/1999 | Hansson et al. | |
| 5,875,824 A | 3/1999 | Atwell et al. | |
| 6,065,509 A | 5/2000 | Bonney et al. | |
| 6,182,712 B1 | 2/2001 | Stout et al. | |
| 6,267,155 B1 | 7/2001 | Parks et al. | |
| 7,304,750 B2 * | 12/2007 | Nantel et al. | 356/625 |
| 7,328,559 B2 * | 2/2008 | Gamberini | 53/560 |
| 2001/0052986 A1 * | 12/2001 | Nantel et al. | 356/625 |
| 2008/0087111 A1 * | 4/2008 | Nantel et al. | 73/865 |

FOREIGN PATENT DOCUMENTS

| | | |
|---|---|---|
| DE | 234397 | 5/1909 |
| DE | 531329 | 8/1931 |
| DE | 3210787 | 10/1983 |
| DE | 3607187 | 9/1987 |
| EP | 0531828 | 8/1992 |
| EP | 0634647 | 7/1994 |
| FR | 2537545 | 6/1984 |
| GB | 703745 | 2/1954 |
| GB | 1309424 | 3/1973 |
| GB | 1420364 | 1/1976 |
| GB | 1475593 | 6/1977 |
| GB | 2077422 | 12/1981 |
| GB | 9515340.9 | 7/1995 |
| JP | 07-109031 | 4/1995 |
| SU | 913203 | 3/1982 |
| SU | 1061030 | 12/1983 |
| WO | 95/09615 | 4/1995 |
| WO | 95/16483 | 6/1995 |
| WO | 95/21768 | 8/1995 |
| WO | 95/31238 | 11/1995 |
| WO | 96/04082 | 2/1996 |
| WO | 96/08284 | 3/1996 |
| WO | 97/05018 | 2/1997 |
| WO | 97/41031 | 11/1997 |
| WO | 99/58180 | 11/1999 |
| WO | 01/00262 | 1/2001 |

* cited by examiner

SYSTEMS AND METHODS FOR NON-DESTRUCTIVE MASS SENSING

CROSS REFERENCE TO RELATED APPLICATIONS

This application is a continuation of U.S. patent application Ser. No. 09/731,317, filed Dec. 6, 2000, now U.S. Pat. No. 7,304,750, which claims the benefit of priority to U.S. Provisional Patent Application Ser. No. 60/172,316, filed Dec. 17, 1999, which is incorporated herein by reference.

BACKGROUND OF THE INVENTION

This invention relates generally to the field of measuring, and in particular to the field of mass measurement. More specifically, the invention relates to techniques for measuring the mass of a substance that has been volumetrically metered.

In many fields, there is a need to precisely measure the mass of a substance. For example, substances such as drugs, chemicals, and the like may often need to have their mass measured. For instance, drugs are often prescribed in terms of unit dosages that are often determined based on the mass of the drug formulation. Therefore, the mass of the drug formulation contained in such unit dosages needs to be measured.

A traditional way to measure the mass of a substance is by use of a balance or a scale. Although effective in precisely measuring the mass of a substance, such techniques can be inefficient for commercial production of a product, such as when producing large volumes of unit drug dosages. For example, some unit dosages of drugs consist of a granular or powder drug formulation stored in receptacles, such as blister packs, capsules, caplets, or the like. To test whether the receptacle includes a unit mass of the drug formulation, the receptacle is opened and the powder is removed and weighed. Because of the destructive nature of the test, only periodic samplings are typically performed.

For some types of substances, a convenient way to meter is volumetrically. For example, substances such as powders, granular substances, and the like are easily measured by filling a known volume with the substance. However, merely filling a known volume with a substance does not guarantee that the metered substance has a known mass. For example, when volumetrically metering the substance, the density of the substance may change due to packing conditions, voids within the substance, and the like. Hence, in cases where the mass of the substance needs to be metered, volumetric metering may not guarantee an accurate result.

Hence, the invention is related to techniques for measuring the mass of a substance, and particularly the mass of a substance that has been volumetrically metered. In this way, the invention provides techniques for measuring the mass of a substance in a high throughput manner.

SUMMARY OF THE INVENTION

The invention provides exemplary systems and methods for measuring the mass of the substance. According to one method, the mass is measured by applying energy to the substance and measuring a response resulting from the application of energy. The mass of the substance is then determined based on the measured response.

In one aspect, the substance is volumetrically metered prior to applying the energy. For example, the substance may comprise a powder that is metered by depositing the powder within a metering chamber. To facilitate metering, a vacuum may be drawn through the metering chamber to assist in capturing falling powder into the chamber.

A variety of techniques may be employed to apply energy to the substance. For example, electromagnetic radiation may be directed onto the substance. Conveniently, the electromagnetic radiation may comprise light that is directed onto the substance. Light that is transmitted through the substance or emitted from the substance may then be measured, and the mass determined by correlating the amount of measured light with an associated mass. In some cases, the transmitted or emitted light may create an interference pattern with the light being directed onto the substance. Such an interference pattern may be measured and correlated with an associated mass.

As another alternative, the energy applying step may comprise applying electrical current of a voltage to the substance. The impedance of the substance may then be measured and correlated with an associated mass. As another alternative, vibrational energy may be applied to the substance and the amount of energy dissipation caused by the substance may be measured. For example, a piezo electric element may be vibrated above the substance to subject the substance to pressure changes. The vibrational frequency of the piezo electric element may then be measured after energy has been dissipated by the substance. The measured vibrational frequency may then be compared with a natural oscillating frequency of the piezo electric element, and the change in frequency correlated with an associated mass.

In another aspect of the method, the determined mass may be compared with a range of masses that defines an acceptable unit mass range. In this way, a test is provided to rapidly determine whether the measured substance is within an acceptable range. This information may then be used, for example, to alter the manner in which the substance is being deposited within a metering chamber so that the mass will fall within the acceptable range. For example, when a vacuum is employed to draw powder into a chamber, the amount of vacuum and/or the rate at which the powder is permitted to fall may be varied in a subsequent filling operation based on the measured mass in comparison to the acceptable range.

In another specific aspect, the metering chamber may be included within a rotatable drum that is rotated between multiple positions when depositing powder within the chamber and when measuring the mass of the powder. After the mass has been measured, the drum may be rotated to another position and the powder ejected from the chamber and into a receptacle. In this way, the drum may be continuously rotated between the various positions to deposit a mass of powder into the chamber, to measure the mass of the metered powder, and to eject the powder into a receptacle.

The invention further provides an exemplary system for measuring the mass of a substance. The system comprises a metering chamber that defines a certain volume for receiving a substance. An energy source is positioned to supply energy to the substance when within the metering chamber. At least one sensor is provided to measure a response from the substance due to the application of energy from the energy source. A processor is coupled to the sensor to determine a mass of the substance within the metering chamber based at least in part on the measured response.

In one aspect, the energy source comprises a source of electromagnetic radiation disposed to direct electromagnetic radiation onto the substance. Conveniently, the sensor may comprise a radiometer or a reflectometer to detect the amount of transmitted or emitted light from the substance. The processor may then be employed to determine the mass of the substance by correlating the amount of transmitted or emitted light with a stored mass value. Conveniently, the loss of transmitted light may be computed by comparing an intensity value of a beam of radiation after passing through the substance with an intensity value of a beam from the radiation source that passes through the chamber in the absence of the substance. In one particular aspect, the metering chamber may include a filter at a bottom end upon which the substance rests. The radiation source may be configured to pass a beam through the filter and then through the chamber.

In another particular aspect, the sensor may be configured to measure an interference pattern that is caused by the transmitted or emitted light that interferes with the light being directed onto the substance. The processor may then be configured to determine the mass of the substance by correlating the measured interference pattern with an associated mass.

As another alternative, the energy source may comprise an electrode that is positioned to pass electrical current or a voltage to the substance. With such a configuration, the sensor may comprise a sensing electrode and circuitry to measure the capacitance of the substance. As an alternative, the energy source may comprise a vibratable element for applying vibrational energy to the substance. The sensor may be configured to measure an amount of energy dissipated by the substance. For example, the vibratable element may comprise a piezo electric element for supplying pressurized air pulses to the substance. The sensor may then comprise circuitry to determine the vibrational frequency of the piezo electric element after energy has been dissipated by the substance. The processor may be configured to compare the measured vibrational frequency with a natural oscillating frequency of the piezo electric element, and to correlate the change in frequency with an associated mass.

In another specific aspect, a vacuum source may be placed in communication with the chamber to assist in drawing the substance into the chamber. Further, the chamber may be disposed within a rotatable drum. In this way, the drum may be placed at a filling position where the substance is deposited into the metering chamber. The drum may then be rotated to a station where the mass is metered. Finally, the drum may be rotated to a dispensing position where the metered powder is ejected. Advantageously, the processor may be configured to compare the determined mass of the substance with a range of acceptable mass values. Depending on the outcome of the comparison, the processor may include code to alter the amount of vacuum and/or operation of a fluidization apparatus that fluidizes the substance before being deposited within the metering chamber.

DETAILED DESCRIPTION OF THE INVENTION

Figure 1:
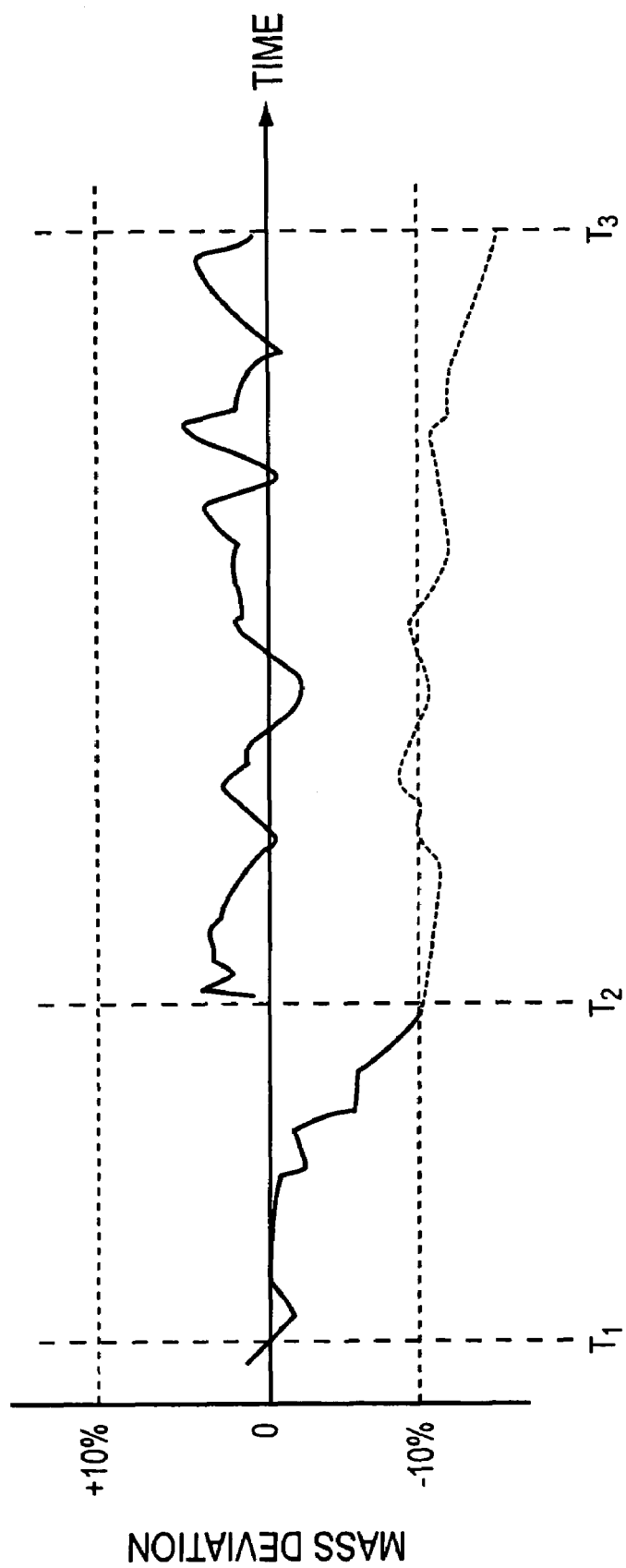
FIG. 1 is a graph illustrating the variance of the mass of a substance that is volumetrically metered over time.

The invention provides exemplary systems and methods for measuring the mass of a substance in a non-destructive manner. The systems and methods may be employed to measure a specific mass or simply to indicate whether a given sample has an acceptable mass. In this way, the masses of samples that are metered in a continuous process may be measured at the time of metering so that unacceptable samples are not continuously produced until the next periodic sampling. For example, as illustrated in the graph of FIG. 1, a metering process may be employed to meter a given substance into unit samples over time using a metering chamber. At time $T_1$, the system is calibrated so that the first sample does not deviate from an acceptable unit mass. However, over time the metered samples have a mass that deviates from the baseline mass. At time $T_2$, the metered sample exceeds a specified range and is therefore considered unacceptable. Hence, if the manner in which the substance is metered is not varied at time $T_2$, the metered samples may continue to be unacceptable until time $T_3$ where one of the samples is removed from its package and measured to discover its unacceptable mass. At this point, the system may be readjusted. However, a number of unacceptable samples will need to be discarded. For example, it may be necessary to discard all the samples produced since the last calibration or comparison, i.e. all samples produced between $T_1$ to $T_3$.

According to the invention, the mass of each sample may be evaluated at the time of filling and in a non-destructive manner so that when one of the samples becomes unacceptable, an error condition may be produced to indicate that the system needs to be readjusted. By non-destructively measuring the mass of each sample, the samples produced between $T_2$ and $T_3$ do not need to be discarded. Rather, the system may be readjusted so that the samples again fall within the acceptable range as shown. The ability to non-destructively sense the mass is useful when the metered samples are placed within receptacles or containers that must be destroyed to extract the samples and weigh the samples using conventional techniques. With the invention, sampling may occur often, e.g. after each sample has been metered, rather than only periodically as is common with destructive mass tests.

The invention may be utilized to measure the mass of a wide variety of substances. Merely by way of example, such substances may include powders, including powders having pharmaceutical agents and/or other pharmaceutically acceptable excipients and that have a mass median diameter in the range from about 0.1 μm to about 100 μm, granular substances, and the like. To facilitate measurement of the mass of such substances, the substances may initially be volumetrically metered, such as in a metering chamber. Non-limiting examples of systems and techniques for metering powered substances are described in U.S. Pat. No. 5,826,633 and co-pending U.S. application Ser. No. 09/312,434, filed May 14, 1999, the complete disclosures of which are herein incorporated by reference. However, it will be appreciated that the invention is not limited to measuring the mass of substances that have been metered in such a manner.

To measure the mass of a metered substance, some form of energy is applied to the substance and a response is measured. The energy may be applied while the substance is within a metering chamber, or after it has been removed from a metering chamber, including while the substance is traveling through the air after being expelled from the metering chamber. The measured response is then compared to empirical data to determine an associated mass, either in absolute terms or in relative terms, e.g. a deviation from an acceptable value. Hence, the invention also encompasses the creation of empirical data showing a relationship between measured responses created by the application of energy and associated masses that have been measured using conventional techniques. Merely by way of example, a beam of light may be shined onto a metered amount of a substance and the loss of transmitted light measured. The metered substance may then be placed onto a scale and weighed to determine the mass. Another sample of the substance may then be metered under different conditions to vary the packing density. Light is shined onto the second substance and the loss of transmitted light measured and stored. The sample is then weighed and associated with the measured transmission value. This process is repeated until a sufficient number of values have been obtained to adequately define a relationship between measured signals and associated masses for a desirable mass range.

Figure 2A:
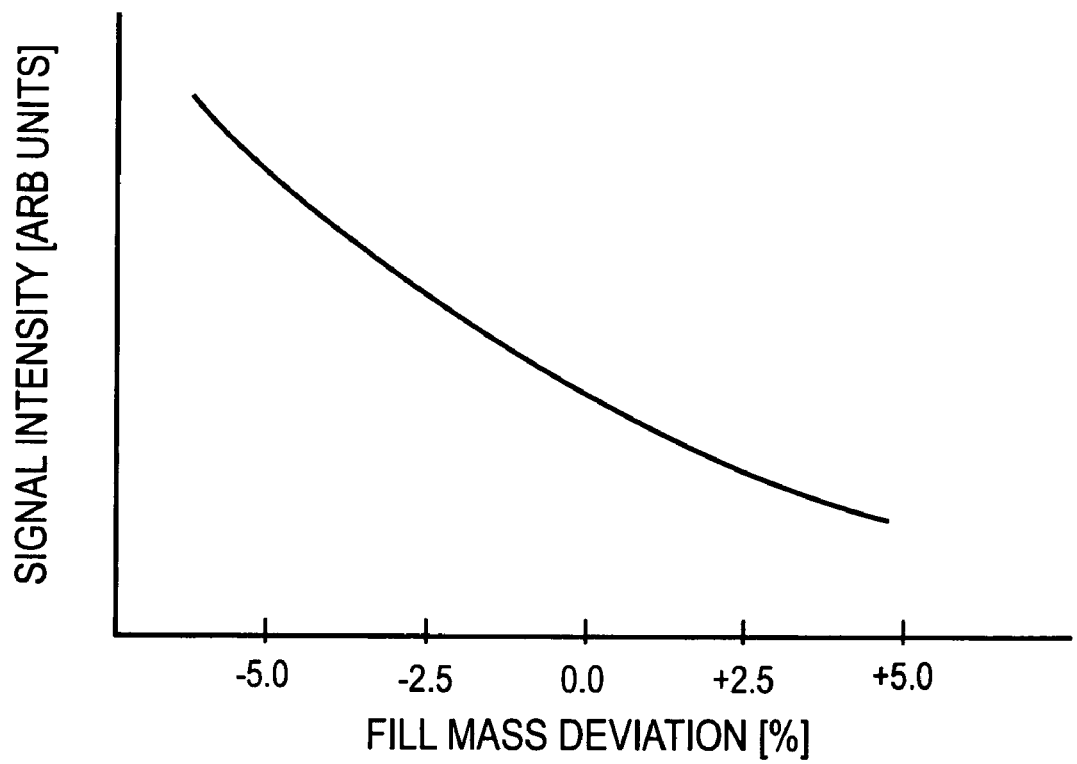
FIG. 2a is a graph illustrating the relationship between a measured signal intensity and a fill mass deviation according to the invention.
Figure 2B:
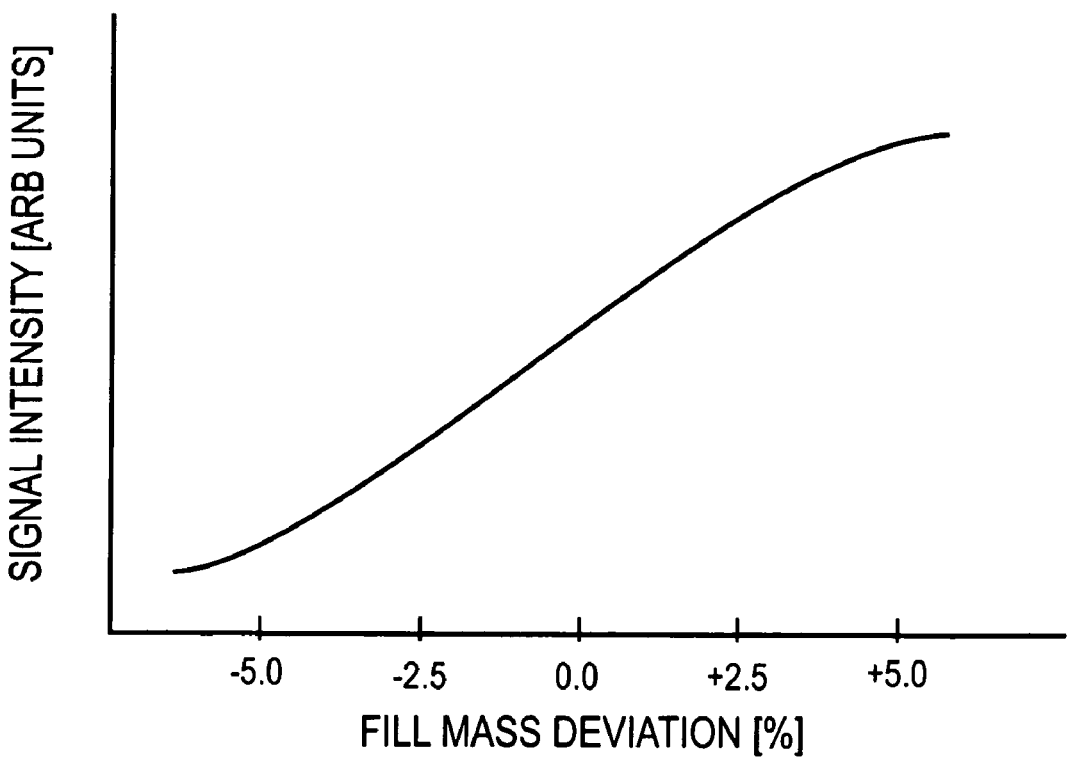
FIG. 2b is another graph illustrating the relationship between a measured signal intensity and a fill mass deviation according to the invention.

Examples of how empirical data may appear when plotted are illustrated in the graphs of FIGS. 2a and 2b. In one aspect, the response curve may vary nearly linearly with fill mass over a certain dynamic range. Because of the limitations of some measurement systems, the linear region may deviate at either end due to conditions such as thresholding and saturation (see FIG. 2b). These and other effects may be the result of the measuring equipment or instrumentation. However, even if the response curve is not linear it may still be useful if it is well characterized and repeatable.

In FIG. 2a, the response curve was generated from transmission data, e.g., light. In FIG. 2b, the response curve was generated using fluorescence and interferometry. Both response curves utilize arbitrary units for signal intensity. Hence, with the examples of FIGS. 2a and 2b, the mass of a metered sample may be determined by subjecting the substance to some form of energy and measuring a appropriate response. Using the information available from the response curve, the measured response is associated with a mass, either in relative terms or as a deviation from a baseline value as shown in FIGS. 2a and 2b.

A wide variety of energy forms may be applied to the substance to measure its mass. Similarly, a wide variety of sensors may be employed to sense and measure the response. For example, types of energy that may be employed include electromagnetic radiation energy, including radiation in the ultraviolet, visible, infrared, millimeter wave and microwave spectra, electrical energy, mechanical energy, including vibrational energy, and the like. A variety of sensing modalities may also be employed including infrared transmission, capacitance, x-ray defraction, beta decay attenuation, and the like.

Electromagnetic radiation may be employed to interact with the substance through diverse phenomena which may then be correlated with the mass of the powder. Such phenomena include, for example, absorption, scattering, fluorescence and interference. These phenomena may span a wide spectrum of wavelengths, including ultraviolet, visible, infrared, millimeter wave, and microwave as previously described. Once a phenomenon of interest has been specified within a wavelength band, various approaches may then be employed to implement the phenomenon of interest. For example, electromagnetic radiation may propagate freely, e.g. using lenses and antenna, or be constrained as a guide wave, e.g. within optical fibers, planar integrated structures, microstrip circuits, other conduits, and the like. Further, the measurand may be transduced in a variety of ways, including the use of a single detector, video imaging, synthetic aperture techniques, and the like. Processing the signal may involve synchronous detection, averaging, adaptive filtering, tomography and the like.

Figure 3:
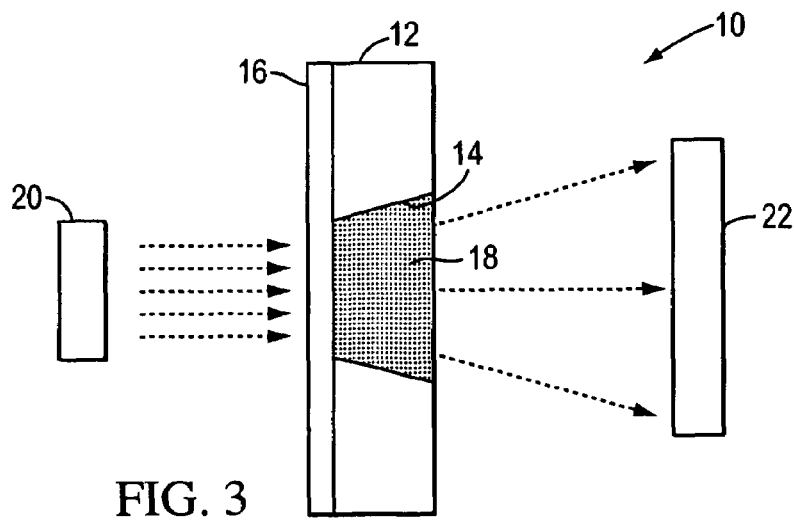
FIG. 3 is a schematic side view of a mass measuring system using a source of electromagnetic radiation.

Referring now to FIG. 3, one embodiment of a mass measuring system 10 will be described. System 10 comprises a change tool 12 that forms a metering chamber 14. Disposed below metering chamber 14 are a set of filters 16. Change tool 12 is particularly useful with a powder filling system where air or other gases are drawn through metering chamber 14 to capture fluidized powder within metering chamber 14 in a manner similar to that described in U.S. Pat. No. 5,826,633 and co-pending U.S. patent application Ser. No. 09/312,434, filed May 14, 1999, previously incorporated by reference. However, it will be appreciated that system 10 may be used in connection with essentially any type of metering chamber, and is not limited to metering chambers formed within specific change tools.

As shown in FIG. 3, once metering chamber 14 has been filled with powder the powder forms a puck 18, i.e. a loosely packed tablet. Disposed on one side of change tool 12 is a light source 20 for directing light onto a surface of puck 18 as shown. Although light source 20 is shown on the side of change tool 12 having filter 16, it will be appreciated that light source 20 may be used on the other side of change tool 12 as well. Positioned to detect light from puck 18 is a detector 22.

System 10 may be employed in one of two modes. First, detector 22 may be configured to detect the loss of transmitted light or the stimulation of fluorescence. With either approach, light source 22 is positioned to direct light toward one side of puck 18 while detector 22 is positioned on the other side of puck 18 to intercept the available light. When detecting the loss of transmitted light, the detected light is of the same wavelength as is produced by source 20. With the stimulation of fluorescence, the detected light is of a longer wavelength than produced by source 20. The light from source 20 may be focused, collimated, or divergent. Further, the light may be modulated, pulsed or continuous. As another option, the spectral distribution may be narrow or broad band, optionally with a characteristic signature. Further, the light emissions may be incoherent or possess some coherence length.

Detector 22 may be configured to have a spectral response adequate for detection of the light impinging on its surface. Detector 22 may be operated at room temperature or may be cooled. Further, detector 22 may optionally incorporate some amplification electronics. Both source 20 and detector 22 may include various optical elements, such as lenses, wavelength filters, spatial filters, optical fibers, and associated mounting hardware.

In one specific embodiment, detector 22 may comprise a silicon detector radiometer. For instance, one type of radiometer that may be employed is Model No. IL1700, from International Light. Light source 20 may comprise a laser, such as a 5 mW, 630 nm, laser, commercial available from Coherent.

Hence, with system 10 the mass of puck 18 may be determined simply by measuring the loss of transmitted light or the stimulation of fluorescence when light from source 20 is shined onto puck 18. The measured light or fluorescence may then be associated with a corresponding mass using a predefined empirical relationship in a manner similar to that previously described.

Figure 4:
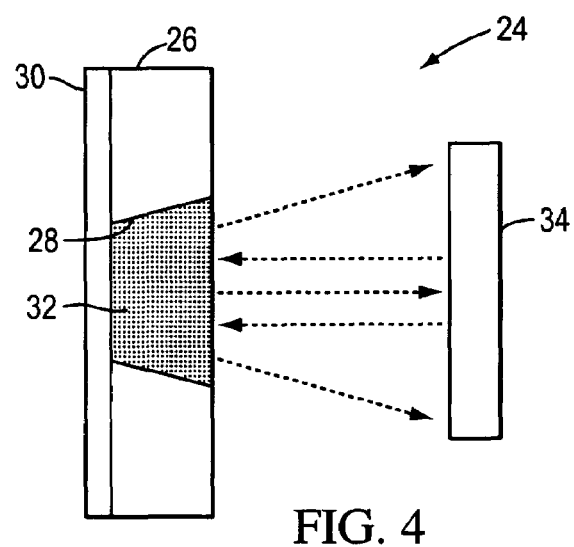
FIG. 4 is a schematic side view of an alternative mass measuring system utilizing the principal of optical coherence interferometry to measure the mass.

FIG. 4 illustrates an alternative mass measuring system 24 that utilizes a change tool 26 that defines a metering chamber 28 and includes a filter 30 similar to the embodiment of FIG. 3 as previously described. Metering chamber 28 is filled with a powder puck 32. System 24 further includes a combined light source/detector 34 that is employed to direct light onto powder puck 32 as shown by the arrows. The detector may then be employed to detect the reflection of light or the stimulation of fluorescence. With either approach, at least a portion of the puck's volume beneath the surface is involved in producing the reflected light or the stimulation of fluorescence. For example, the light source may be configured so that the light penetrates a certain distance into puck 32 in order to profile the packing density of puck 32. Below this distance, the mass variation of the powder is assumed to be constant. Hence, only a top portion of the puck needs to be evaluated to determine whether the mass of puck 32 will vary beyond an acceptable range. Conveniently, light source/detector 34 may be configured such that the light source and detector share some or all of the same optical elements.

The light source and detector of system 24 may be employed to measure the mass of puck 32 in a manner similar to light source 20 and detector 22 of system 10 as previously described. Alternatively, system 24 may be configured to measure the mass using optical coherence interferometry using one common optical fiber for both source and detector optics. This technique permits the packing density of puck 32 to be profiled within a region beneath the surface of puck 32 based on interference patterns generated by the interference of the reflected or fluorescent light with the light being directed onto the surface of puck 32.

In one specific embodiment, a precision reflectometer may be employed to measure light from puck 28. One specific reflectometer that may be used is Model No. HP8504B, commercially available from Agilent.

Figure 5:
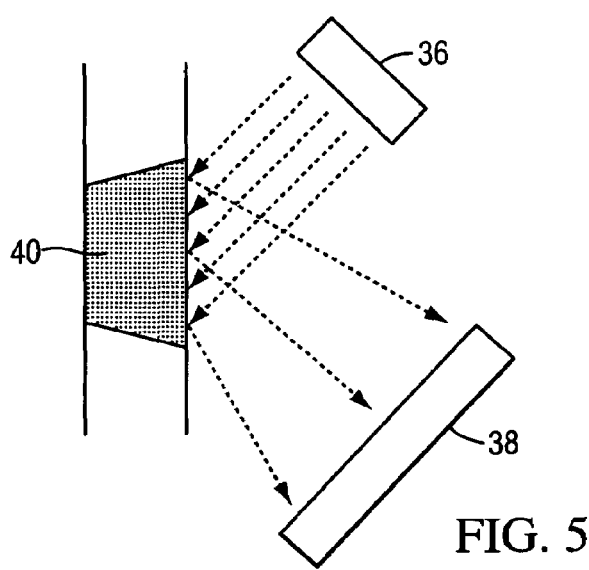
FIG. 5 is a schematic side view of another alternative mass measuring system which uses optical coherence interferometry to measure the mass.

As shown in FIG. 5, system 24 may be modified to include a light source 36 that is separate from a detector 38. Source 36 and detector 38 are directed toward the same face of puck 40 at an angle to optimize detection. Detector 38 may be employed to measure reflected light, fluorescent light or interference patterns as previously described.

Some of the substances utilized by the invention, such as powders, may be dielectric in nature. As such, the capacitance of a circuit that includes a metered amount of a substance may be employed to determine the mass of the substance. Conveniently, the metering chamber may be formed of a conducting material which may form one electrode in the circuit.

Figure 6:
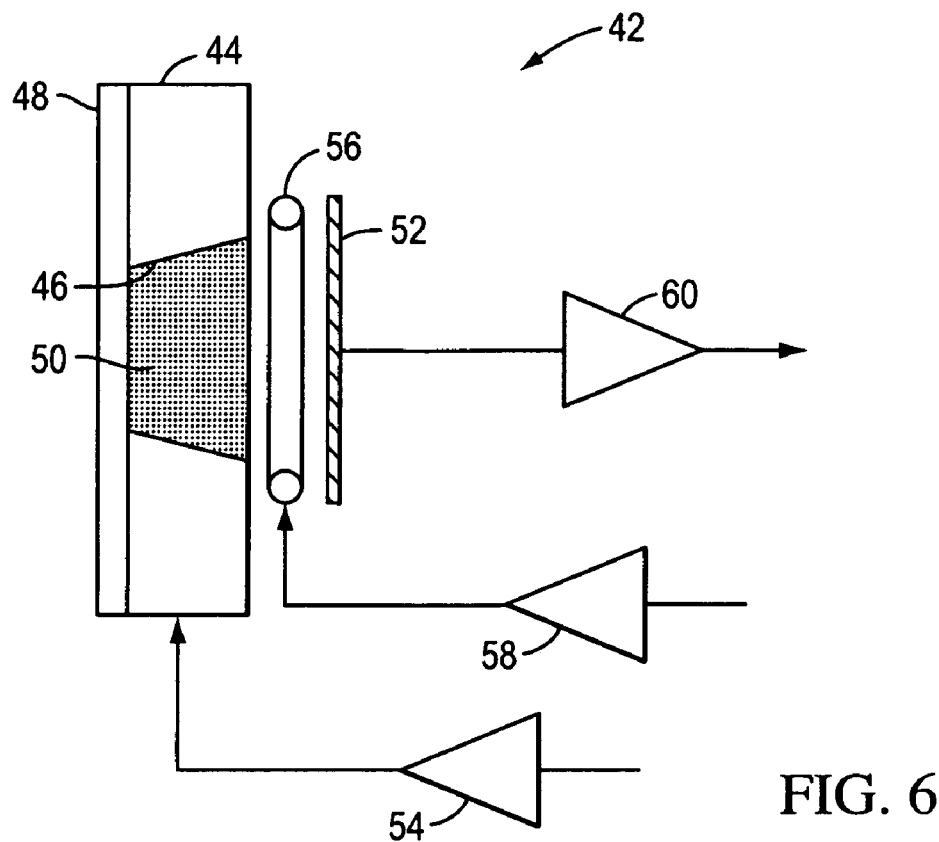
FIG. 6 is a schematic side view of a mass measuring system which measures capacitance to determine the mass of a substance.

One specific example of a mass measuring system 42 for measuring impedance or capacitance is illustrated in FIG. 6. System 42 comprises a change tool 44 defining a metering chamber 46 and including filters 48 in a manner similar to that described with previous embodiments. As shown, chamber 46 is filled with a powder puck 50 that is dielectric in nature. Change tool 44 is constructed of a conductive material and serves as one electrode. A sensing electrode 52 is also provided, with change tool 44 and sensing electrode 52 forming the plates of a capacitor. Change tool 44 may be passively tied to ground potential or it may be driven to a potential using a reference electrode drive 54. The potential may be any value, including ground potential. System 42 further includes a guard electrode 56 and a guard drive 58 to serve as an electric shield. The detection electronics may be single ended or may be an impedance bridge 60, with the puck capacitor as one element of a bridge arm. In this way, when the electrodes are energized, the capacitance or impedance of puck 50 may be determined. The measured response may then be correlated with an associated mass in a manner similar to that previously described.

In one specific embodiment, a dielectric analyzer may be employed when measuring the capacitance of system 42. For example, one type of dielectric analyzer that may be employed is Model No. HP4291B, commercially available from Hewlett Packard.

Another technique for measuring the mass of a substance is to provide a tuned mechanical or electromechanical system whose resonance condition is affected by changes in its mass. An increase in mass coupled to a resonant electromechanical system may result in an increase in energy dissipation and a dampening of the resonant condition. The resonant frequency may also be affected. Any of these events may be detected and employed to determine the mass of the substance included within the system.

Figure 7:
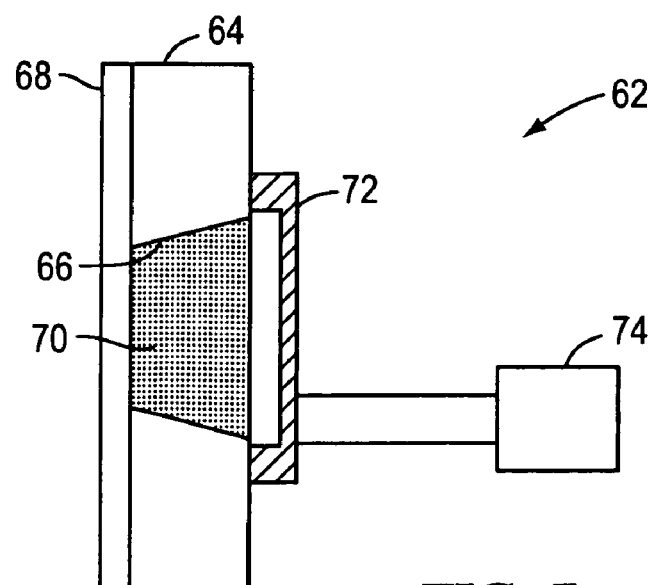
FIG. 7 is a schematic side view of an electromechanical resonant mass measuring system utilizing a piezo electric element.

One non-limiting example of such an electromechanical resonance system 62 is illustrated in FIG. 7. System 62 includes a change tool 64 that defines a metering chamber 66 and includes a filter 68 similar to other embodiments. A powder puck 70 is disposed within chamber 66. Rigidly affixed to change tool 64 is a piezo electric element 72. When powder puck 70 fills metering chamber 66, a column of air is sealed between puck 70 and piezo electric element 72. An electronic bridge 74 may be employed to actuate vibration of piezo electric element 72 to provide pressure pulses to the surface of puck 70. In some cases, piezo electric element 72 may also vibrate change tool 64. Without puck 70, piezo electric element 72 vibrates at a natural harmonic frequency. When puck 70 fills metering chamber 66, piezo electric element 72 vibrates at a different frequency. This change may be detected by electronic bridge 74 and used to correlate an associated mass in a manner similar to that previously described.

Figure 8:
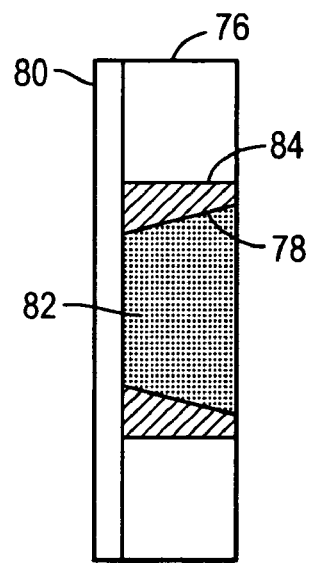
FIG. 8 is a schematic side view of a mass measuring system having an energy source and detector integrated into a metering chamber.
Figure 9:
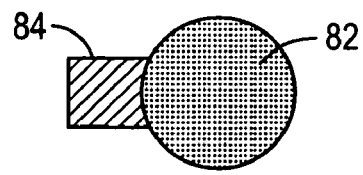
FIGS. 9-11 illustrate top schematic views of other embodiments of metering chambers having different arrangements of energy sources and detectors for measuring the mass of a substance within the metering chamber according to the invention.
Figure 10:
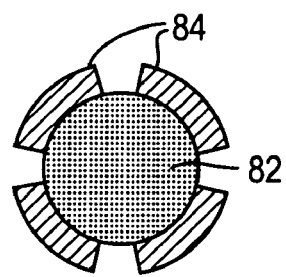
Figure 11:
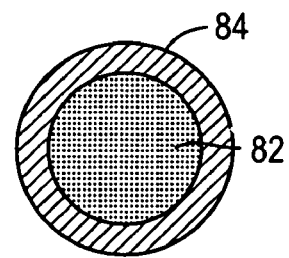

Any of the energy sources and/or detectors as described herein may be constructed to be intregally formed within a change tool or other structure that forms the metering chamber. Such an example is illustrated schematically in FIG. 8 where a change tool 76 is shown. Change tool 76 defines a metering chamber 78 and includes filters 80 similar to other embodiments. A powder puck 82 fills chamber 78. Formed about the walls of chamber 78 is a source and/or detector element 84. Element 84 is representative of any of the sources, detectors, and/or electronics as previously described in connection with the other embodiments. As shown in FIG. 9, element 84 may comprise a single discrete element. FIG. 10 illustrates element 84 as an array of elements suitable for dielectric or optical tomography, and FIG. 11 illustrates element 84 as a continuous annular element. In this way, the amount of space required when constructing a mass measuring system may be significantly reduced.

Figure 12:
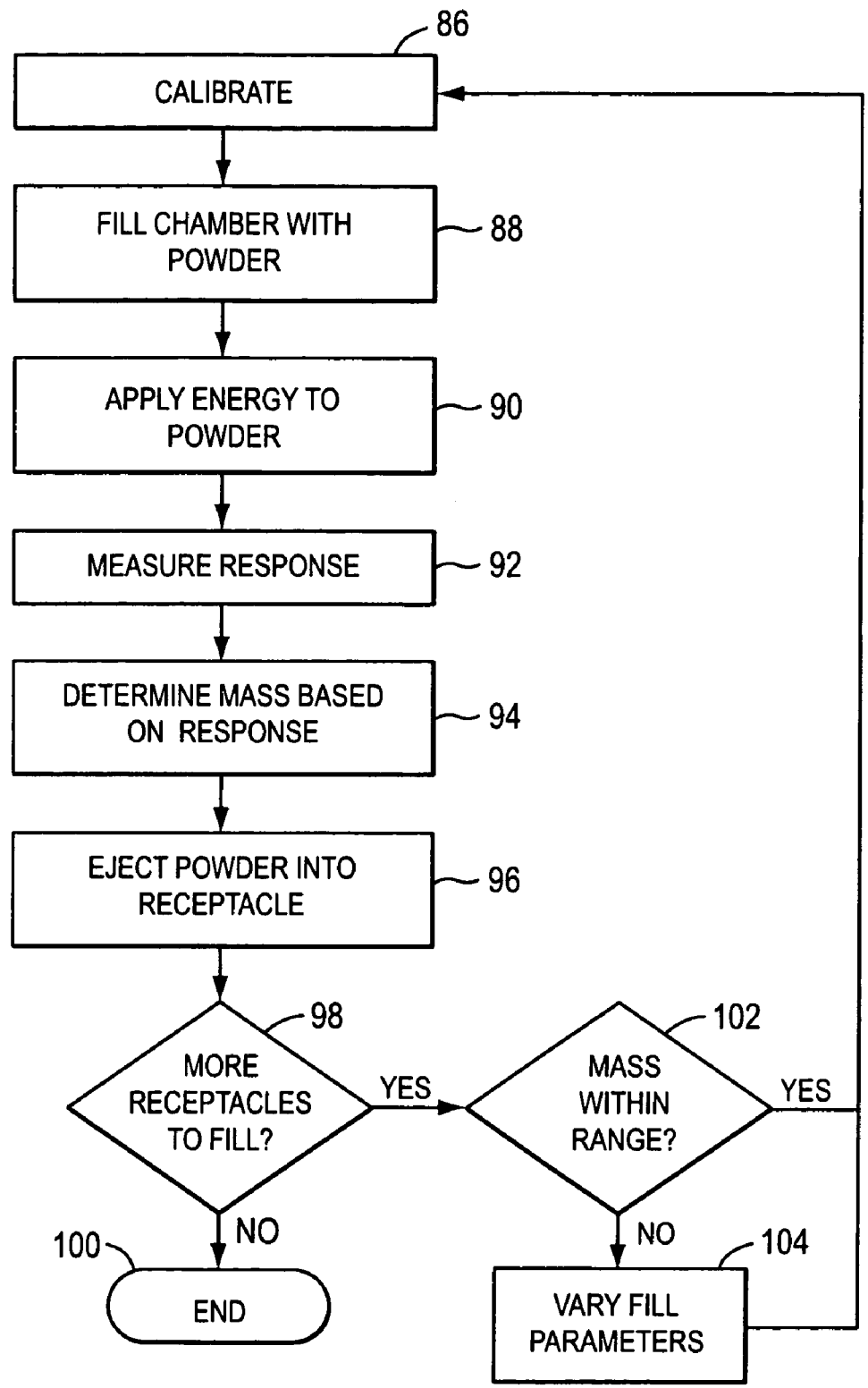
FIG. 12 is a flow chart illustrating one method for measuring the mass of a substance according to the invention.

Referring now to FIG. 12, one method that may be utilized to measure the mass of a substance will be described. Initially, a mass measuring system is calibrated as shown in step 86. The manner in which the system is calibrated depends upon the particular sensors and/or detectors being employed. For example, when directing light through the substance to perform the mass measurement, the system may be calibrated by directing light through the metering chamber when the metering chamber is empty. This measurement may then be used as a baseline value. As shown in step 88, the chamber is then filled with powder so that a metered volume of powder is within the chamber. Energy is then applied to the powder as illustrated in step 90, and a response is measured as shown in step 92. The mass is then determined based on the measured response as shown in step 94. As previously described, this may be accomplished by referring to empirical data. Optionally, the powder may then be ejected into a receptacle as shown in step 96. The method then proceeds to step 98 where a determination is made as to whether more receptacles are to be filled. If none are left to be filled, the process ends at step 100. If more are to be filled, the process proceeds to step 102 where the measured mass is compared with a range of acceptable masses to determine whether the measured mass of the ejected powder is within an acceptable range. If not, the process proceeds to step 104 where fill parameters of the system may be varied. Optionally, a flag may also be provided to apprise the operator of the unacceptable mass. The process then reverts back to step 86 where the system is recalibrated and continues as previously described.

Figure 13:
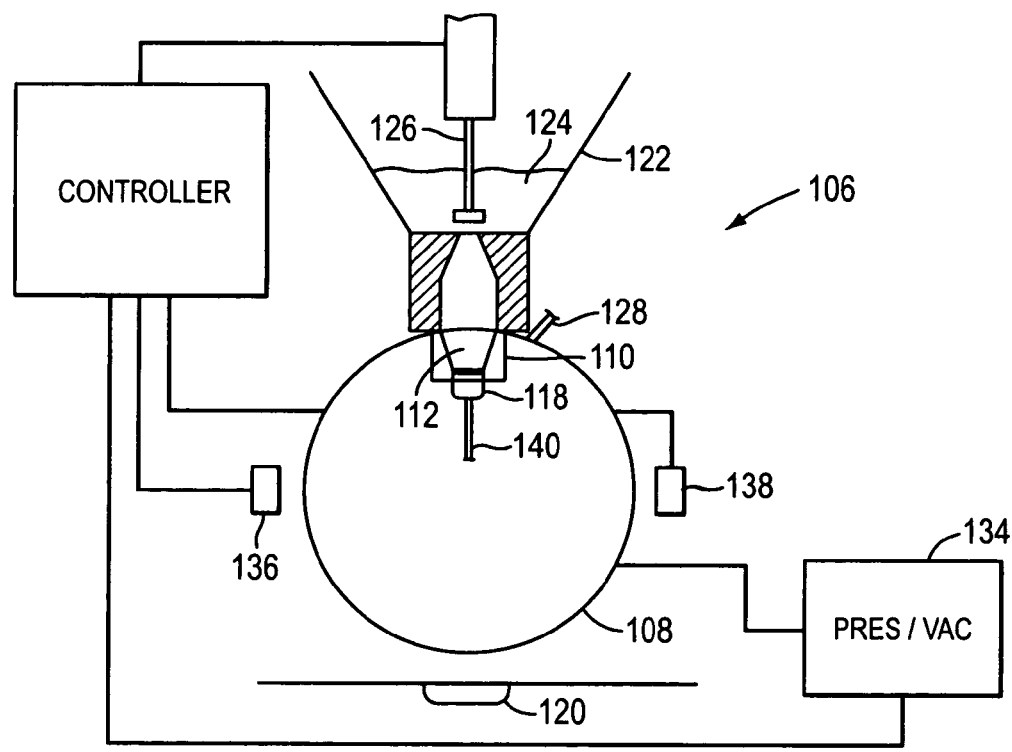
FIG. 13 is a schematic side view of a powder filling system that includes components for sensing the mass of a metered substance according to the invention.
Figure 14:
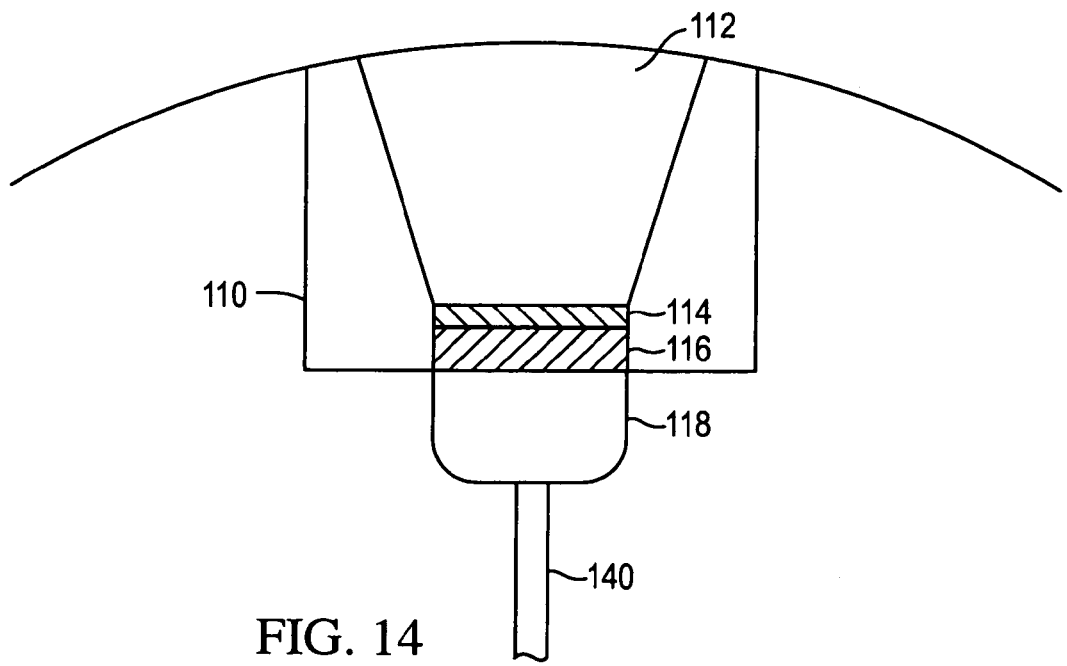
FIG. 14 is a more detailed view of a metering chamber of the system of FIG. 13.
Figure 15:
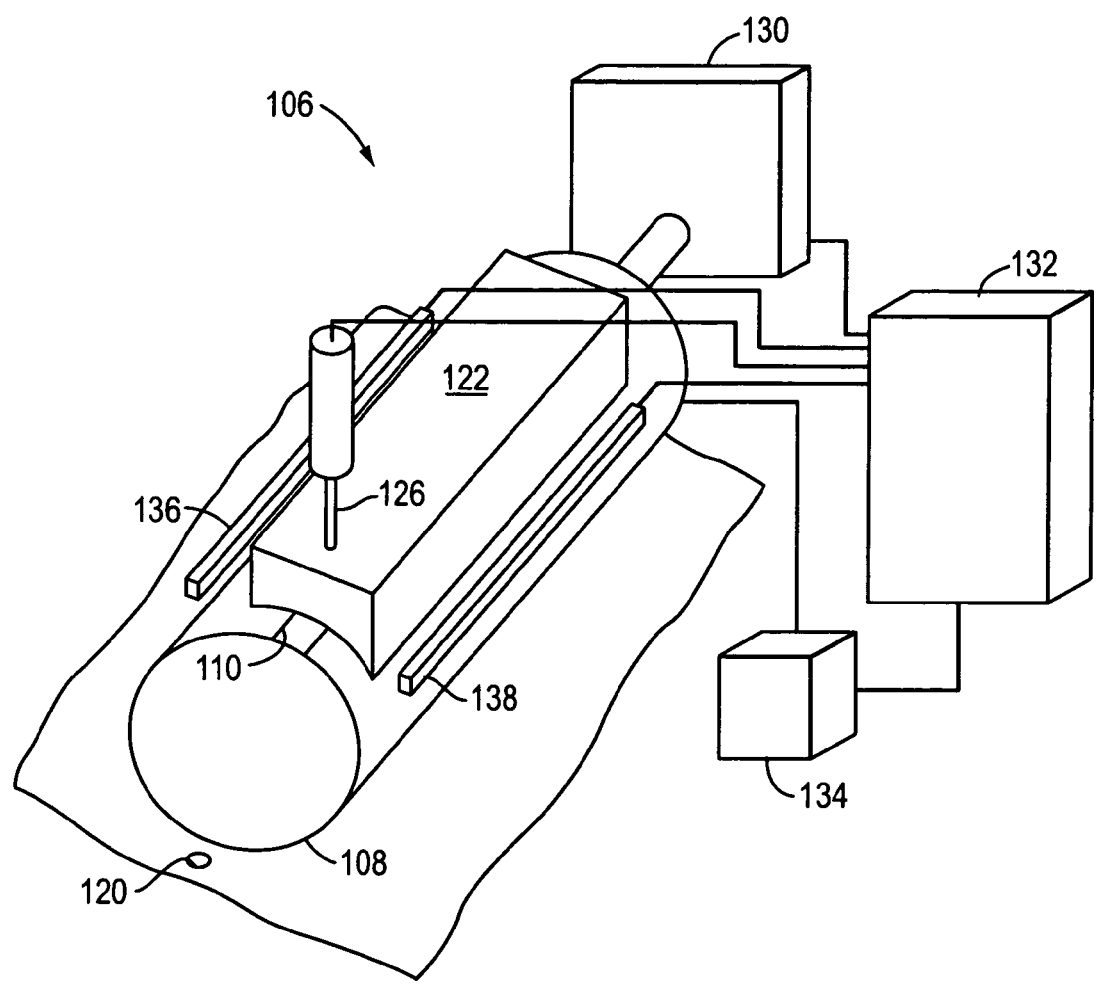
FIG. 15 is a perspective schematic view of the system of FIG. 13.

The mass measuring systems and techniques of the invention may be employed with essentially any type of metering system. Merely by way of example, one type of metering system 106 that may be used with the techniques of the invention is illustrated in FIG. 13. Metering system 106 is similar in some aspects to the powder filling systems described in U.S. Pat. No. 5,826,633 and co-pending U.S. application Ser. No. 09/312,434, previously incorporated by reference. As also shown in FIG. 15, metering system 106 includes a rotatable drum 108 that includes a change tool 110 having a plurality of metering chambers 112. Disposed below metering chambers 112 are a pair of filters 114 and 116 as best illustrated in FIG. 14. A manifold 118 is positioned between metering chambers 112 and serves as a conduit for a vacuum and/or pressurized air when filling metering chambers 112 with powder or ejecting the metered powder pucks from metering chambers 112 and into cavities 120. Receptacles or blister packs may be formed by enclosing cavities 120 as is known in the art.

As shown in FIG. 15, positioned above rotatable drum 108 is a hopper 122 for holding an amount of powder 124. A vibratable element 126 is configured to move within hopper 122 while vibrating to fluidize powder 124 and to assist its introduction into chambers 112. Following filling of chambers 112, rotatable drum 108 is rotated so that a doctor blade 128 may scrape off any excess powder extending above metering chambers 112. Rotatable drum 108 may be further rotated so that metering chambers 112 are aligned with cavities 120 to permit the metered powder to be ejected into cavities 120.

A motor 130 is employed to rotate rotatable drum 108. A controller 132 is coupled to motor 130 to control operation of motor 130. The controller 132 is also coupled to vibratable element 126 to control both its translation within hopper 122 as well as the frequency of vibration. A vacuum/pressure source 134 is also coupled to controller 132 and to rotatable drum 108 to supply the vacuum and/or positive pressure as appropriate.

System 106 further includes a pair sensors 136 and 138. Included within rotatable drum 108 are a series of optical fibers 140 that are each aligned with one of the metering chambers. The controller is also employed to control a light source which supplies light to optical fibers 140 and to control operation of sensors 136 and 138.

With such a configuration, rotatable drum 108 may be moved so that metering chambers 112 are aligned with sensors 136. Light may then be shined through optical fibers 140 and detected by sensors 136 while cavities 112 are empty of powder. This measurement then serves as the calibrating or baseline measurement. Rotatable drum 108 may then be moved to align metering chambers 112 with hopper 122. Vibratable element 126 may then be actuated to fill metering chambers 112 with powder as previously described. Rotatable drum 108 is then moved to align the filled chambers 112 with sensors 138. Light is then shined through optical fibers 140 and a measurement is taken with sensors 138. The controller may then be configured to determine the loss of light transmission and/or fluorescence and associate this value with a corresponding mass value. The controller may also be configured to determine whether this value is within an acceptable range.

Optionally, the controller may be configured to vary certain parameters of system 106 if the mass is not within an acceptable range. For example, the controller may control the rate of translation or the frequency of vibration of vibratable element 126. The controller may also be configured to vary the vacuum drawn through metering chambers 112 when being filled. Hence, after each filling operation, the mass of the metered powder puck may be evaluated and the system may be altered to ensure that the metered powder remains within acceptable ranges.

Figure 16:
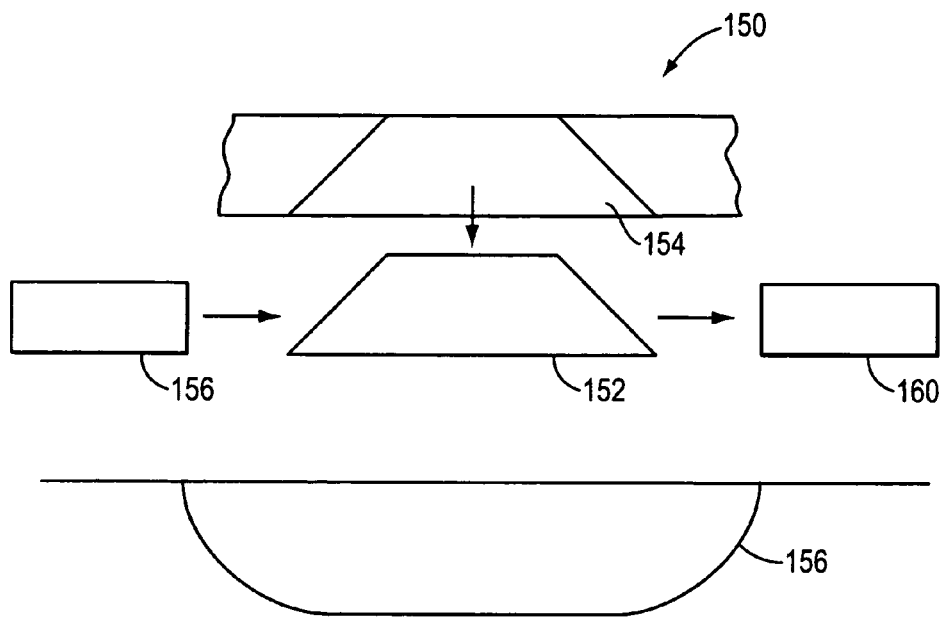
FIG. 16 is a schematic view of an alternative system for measuring the mass of a substance according to the invention.

The mass of a metered substance may also be measured after being ejected from a metering chamber. FIG. 16 illustrates a system 150 that may be used to measure the mass of a puck 152 after it has been metered within a metering chamber 154. In FIG. 16, puck 152 has been ejected from metering chamber 154 and is traveling through the air toward a receptacle 156. An energy source 158 is employed to direct energy onto puck 152 and a sensor 160 is employed to sense a response using any of the techniques previously described herein, including, for example, dielectric capacitance, optical, or fluorescence. Based on the measured response, an associated mass may be determined in a manner similar to that previously described herein.

EXPERIMENTAL

The following is one non-limiting example of a technique that may be employed to determine a relationship between light transmitted through powder pucks and their associated masses. In this example, a system similar to the system of FIG. 3 (without the use of filter 16) was employed. Initially, a powder puck was manually placed into a metering chamber of fixed volume within a change tool. The change tool was held horizontally such that the wide portion of the metering chamber faced upwards. Powder was introduced into the metering chamber with a spatula while a slight vacuum was applied to the back of the metering chamber. The vacuum served to compress the powder into a formed puck.

After forming the puck, the change tool was placed in a rigid fixture. A laser (630 nm, 5 mW, Coherent) was positioned so that its beam was perpendicular with the change tool and was centered on the metering chamber. The laser beam cross section was essentially circular and of sufficient diameter to completely illuminate the back of the metering chamber. A silicon detector was positioned near the wide face of the metering chamber so as to receive the transmitted laser light. The detector's face was parallel to the change tool and concentric with the metering chamber. The detector's response was recorded with a radiometer (IL1700, International Light).

Figure 17:
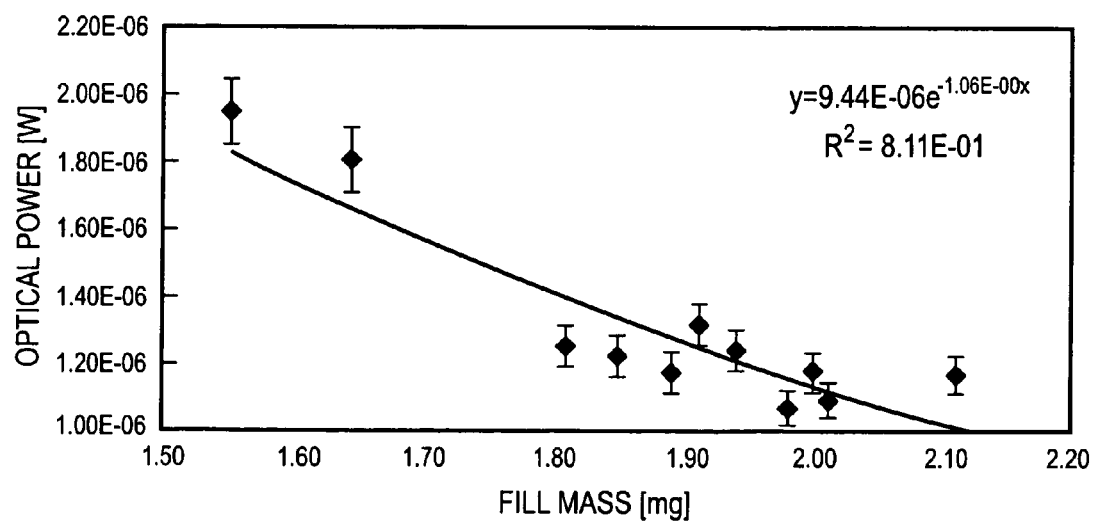
FIG. 17 is a graph illustrating the relationship between light transmitted through various powder pucks and their associated mass according to the invention.

The change tool was then removed from the fixture and a slight positive pressure was applied to the back of the metering chamber in order to eject the puck into a weigh boat resting on a microbalance (MT-05, Mettler-Toledo). The mass of the puck was recorded as an increase from the mass of the weigh boat. This procedure was repeated for several pucks to obtain a relationship between transmitted light and puck mass, as shown in FIG. 17.

The invention has now been described in detail for purposes of clarity of understanding. However, it would be appreciated that certain changes and modifications may be practiced within the scope of the appended claims.

What is claimed is:

1. A method for measuring the mass, the method comprising: applying energy to a powder substance which comprises a pharmaceutical agent, wherein the powder substance comprises particles having a mass median diameter from about 0.1 µm to about 100 µm; measuring a response resulting from the application of energy; and determining the mass of the powder substance based on the measured response; ejecting the powder substance into a receptacle.

2. The method of claim 1, wherein the receptacle is a blister.

3. The method of claim 1, wherein the receptacle is a capsule.

4. A method as in claim 1, further comprising volumetrically metering the powder substance prior to applying the energy.

5. A method as in claim 4, wherein the metering step comprises depositing the powder substance within a metering chamber.

6. A method as in claim 5, wherein a vacuum is applied to the metering chamber during the depositing of the powder substance within the metering chamber.

7. A method as in claim 5, wherein the powder substance is deposited within the metering chamber from a hopper positioned above the metering chamber.

8. A method as in claim 7, wherein a vibratable element is provided within the hopper to assist in depositing the powder substance within the metering chamber.

9. A method as in claim 5, wherein the metering chamber is in a rotatable drum.

10. A method as in claim 1, wherein the energy applying step comprises directing electromagnetic radiation onto the powder substance.

11. A method as in claim 1, wherein the energy applying step comprises directing light onto the powder substance.

12. A method as in claim 11, wherein the measuring step comprises measuring light transmitted through the powder substance, and wherein the determining step comprises correlating the measured light with an associated mass.

13. A method as in claim 11, wherein the measuring step comprises measuring light emitted from the powder substance, and wherein the determining step comprises correlating the measured light with an associated mass.

14. A method as in claim 11, wherein the measuring step comprises measuring an interference pattern caused by transmitted or emitted light from the powder substance interfering with the light directed onto the powder substance, and wherein the determining step comprises correlating the interference pattern with an associated mass.

15. A method as in claim 1, wherein the energy applying step comprises applying current or voltage to the powder substance, wherein the measuring step comprises measuring the impedance of the powder substance, and wherein the determining step comprises correlating the impedance with an associated mass.

16. A method as in claim 1, wherein the energy applying step comprises applying vibrational energy to the powder substance, and wherein the measuring step comprises measuring the energy dissipation caused by the powder substance.

17. A method as in claim 16, wherein the step of applying vibrational energy comprises vibrating a piezoelectric element to subject the powder substance to pressure changes, wherein the measuring step comprises measuring the vibrational frequency of the piezoelectric element after energy has been dissipated by the powder substance, and wherein the determining step comprises comparing the measured vibrational frequency with a natural oscillating frequency of the piezoelectric element, and correlating the change in frequency with an associated mass.

18. A method as in claim 1, further comprising comparing the determined mass with a range of masses that defines an acceptable unit mass range to determine whether the measured powder substance is within the acceptable range.

19. A method as in claim 1, further comprising processing the response using tomography.

20. A method as in claim 1, wherein the powder substance further comprises a pharmaceutically acceptable excipient.

* * * * *